(12) United States Patent
Manabe et al.

(10) Patent No.: US 10,707,726 B2
(45) Date of Patent: Jul. 7, 2020

(54) COOLING STRUCTURE FOR DYNAMO-ELECTRIC MACHINE

(71) Applicant: Nissan Motor Co., Ltd., Yokohama-shi, Kanagawa (JP)

(72) Inventors: Tomoyuki Manabe, Kanagawa (JP); Takenari Okuyama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 55 days.

(21) Appl. No.: 15/746,036

(22) PCT Filed: Jun. 8, 2016

(86) PCT No.: PCT/JP2016/067046
§ 371 (c)(1),
(2) Date: Jan. 19, 2018

(87) PCT Pub. No.: WO2017/018067
PCT Pub. Date: Feb. 2, 2017

(65) Prior Publication Data
US 2018/0205294 A1   Jul. 19, 2018

(30) Foreign Application Priority Data
Jul. 28, 2015  (JP) ................... 2015-149033

(51) Int. Cl.
*H02K 9/19* (2006.01)
*H02K 1/32* (2006.01)

(52) U.S. Cl.
CPC ............... *H02K 9/19* (2013.01); *H02K 1/32* (2013.01)

(58) Field of Classification Search
CPC .................. H02K 9/19; H02K 5/20
(Continued)

(56) References Cited

U.S. PATENT DOCUMENTS

| 2009/0184592 A1* | 7/2009 | Sano ................ H02K 9/19 310/59 |
| 2010/0194220 A1* | 8/2010 | Tatematsu ......... H02K 1/2766 310/61 |

(Continued)

FOREIGN PATENT DOCUMENTS

| DE | 102009029716 A1 | 12/2009 |
| JP | 2006-6091 A | 1/2006 |

(Continued)

OTHER PUBLICATIONS

"Integral, adj. and n." OED Online. Oxford University Press, Mar. 2019. Web. May 24, 2019. (Year: 2019).*

(Continued)

*Primary Examiner* — Thomas Truong
(74) *Attorney, Agent, or Firm* — Global IP Counselors, LLP

(57) ABSTRACT

A cooling structure is provided for a dynamo-electric machine. The cooling structure has a refrigerant supply path for introducing a refrigerant into a rotor, and refrigerant outlets that are opened to the refrigerant supply path so that the refrigerant will be splashed onto the coil ends of a stator as the rotor rotates. Blocking wall members are provided in refrigerant splash paths between the refrigerant outlets and the coil ends for blocking a portion of the refrigerant, which splashes from the refrigerant outlets when the rotor rotates. The rate at which the blocking wall members shield the coil ends against the refrigerant is low when the rotor rotates at a low speed and is high when the rotor rotates at a high speed.

9 Claims, 13 Drawing Sheets

(58) Field of Classification Search
USPC .................................. 310/52, 54, 58, 59
See application file for complete search history.

(56) References Cited

U.S. PATENT DOCUMENTS

| | | | | |
|---|---|---|---|---|
| 2012/0299404 A1* | 11/2012 | Yamamoto | ........... | H02K 1/2766 |
| | | | | 310/61 |
| 2013/0020889 A1* | 1/2013 | Yamamoto | ........... | H02K 1/2766 |
| | | | | 310/59 |
| 2014/0054987 A1* | 2/2014 | Miyamoto | ............... | H02K 9/19 |
| | | | | 310/54 |

FOREIGN PATENT DOCUMENTS

| | | | |
|---|---|---|---|
| JP | 2007-159325 A | | 6/2007 |
| JP | 2009-118686 A | | 5/2009 |
| JP | 2009-118714 A | | 5/2009 |
| JP | 2009-171755 A | | 7/2009 |
| JP | 2009-296772 A | | 12/2009 |
| JP | 2010-252544 A | | 11/2010 |
| JP | 2014-82841 A | | 5/2014 |
| JP | 2014087123 A | * | 5/2014 |

OTHER PUBLICATIONS

"Cylinder, n." OED Online. Oxford University Press, Dec. 2019. Web. Jan. 5, 2020. (Year: 2020).*

Machine Translation, Arakawa , JP-2014087123-A, May 2014. (Year: 2014).*

\* cited by examiner

COOLING STRUCTURE FOR DYNAMO-ELECTRIC MACHINE

CROSS-REFERENCE TO RELATED APPLICATIONS

This application is a U.S. National stage application of International Application No. PCT/JP2016/067046, filed Jun. 8, 2016, which claims priority to Japanese Patent Application No. 2015-149033, filed in Japan on Jul. 28, 2015. The disclosure of Japanese Patent Application No. 2015-149033 is entirely incorporated herein by reference.

BACKGROUND

Field of the Invention

The present invention relates to a cooling structure for a dynamo-electric machine that cools a dynamo-electric machine using a refrigerant.

Background Information

Conventionally, in order to develop a compact, high-output motor, a structure to efficiently cool parts that reach a high temperature by introducing a refrigerant inside the motor has been studied.

As such a cooling structure, a cooling structure for a dynamo-electric machine is known in which the refrigerant flow path is switched according to the operating state of the motor by incorporating a refrigerant flow path switching part, configured using a spring, a plate, and the like, in a permanent magnet type motor (for example, see Japanese Laid Open Patent Application No. 2009-118686 hereinafter referred to as Patent Document 1). In this prior art, efficient cooling can be realized by supplying refrigerant to a coil during low-speed rotation at which the coil temperature of the stator becomes high, and by supplying refrigerant in a rotor during high-speed rotation at which the magnet temperature of the rotor becomes high.

SUMMARY

However, in the prior art described above, in order to efficiently cool the motor, it is necessary to incorporate flow path switching parts, such as a spring, a plate, and the like, in the rotor. Consequently, there is the problem that the number of parts is increased, and the assembling steps are increased, leading to an increase in cost. In view of the problems described above, an object of the present invention is to provide a cooling structure for a dynamo-electric machine, capable of inexpensively and efficiently cooling a motor.

The cooling structure for a dynamo-electric machine of the present invention comprises a refrigerant outlet that is opened to a refrigerant supply path, such that the refrigerant splashes toward the coil end of the stator as the rotor is rotated. The present invention is configured as a cooling structure for a dynamo-electric machine, in which the rate at which a blocking wall, provided in a refrigerant splash path between the refrigerant outlet and the coil ends, which shields the coil ends against the refrigerant, is low during low-speed rotation and high during high-speed rotation of the rotor.

In the present invention, the rate at which a refrigerant, which splashes in the refrigerant splash path from the refrigerant outlet toward the coil end due to centrifugal force, is supplied to the coil end and the rotor core can be changed according to the rotational speed of the rotor, using a blocking wall provided between the refrigerant outlet of the rotor and the coil end of the stator. Therefore, it is possible to provide a cooling structure for a dynamo-electric machine that is capable of inexpensively and efficiently cooling a motor.

BRIEF DESCRIPTION OF THE DRAWINGS

Referring now to the drawings, several embodiments of a dynamo-electric machine having a cooling structure is illustrated.

DETAILED DESCRIPTION OF THE EMBODIMENTS

Figure 1:
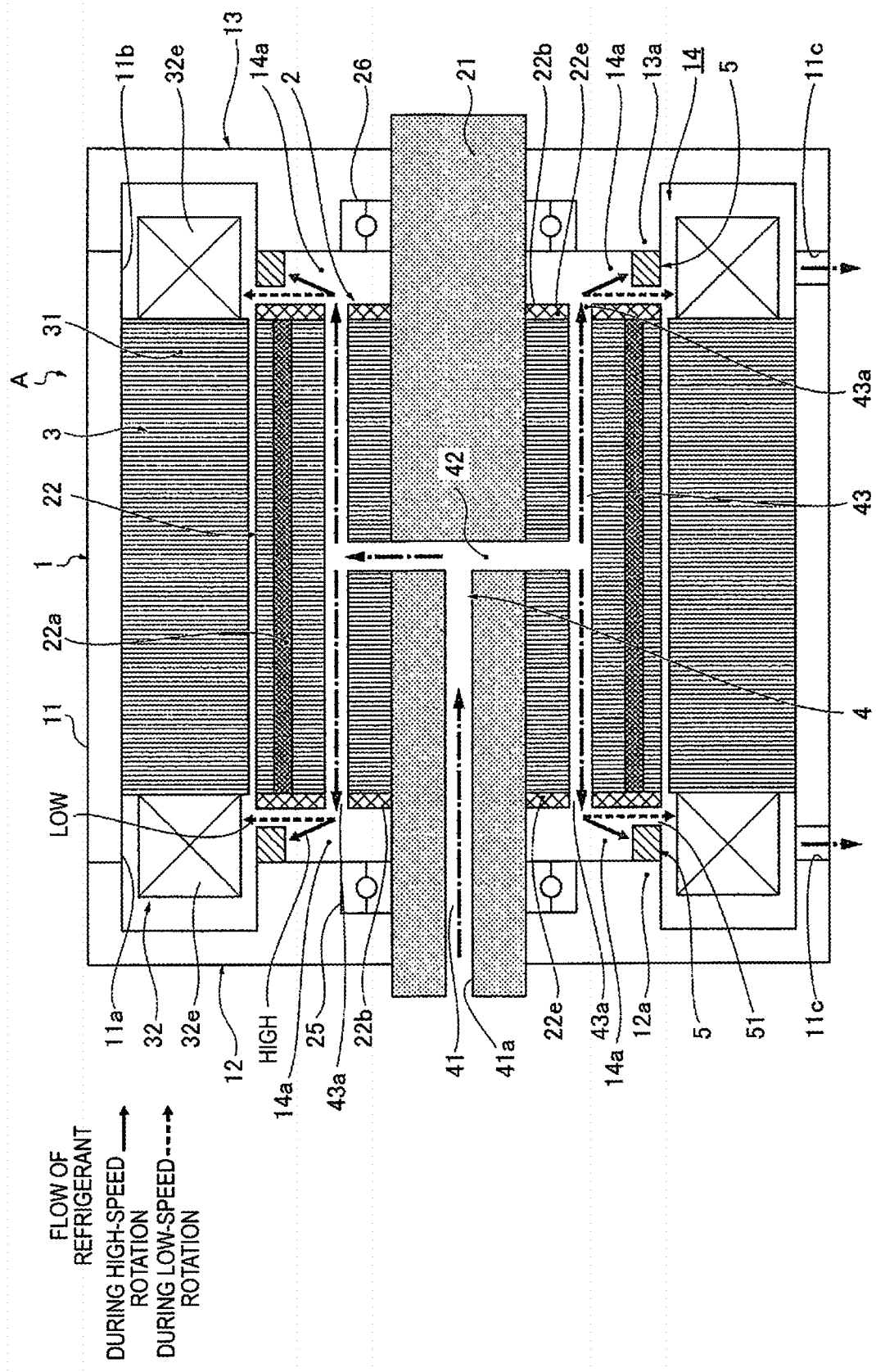
FIG. 1 is a cross-sectional view of a dynamo-electric machine provided with the cooling structure for a dynamo-electric machine according to the first embodiment.

Preferred embodiments for realizing the cooling structure for a dynamo-electric machine of the present invention are described below based on the embodiments illustrated in the drawings.

First Embodiment 1

The configuration of the cooling structure for a dynamo-electric machine according to the first embodiment will be described. First, the structure of a dynamo-electric machine A provided with the cooling structure for a dynamo-electric machine according to the first embodiment will be described. FIG. 1 is a cross-sectional view illustrating the dynamo-electric machine A. This dynamo-electric machine A comprises a housing 1, a rotor 2, and a stator 3.

The housing 1 comprises a housing main body 11 having a substantially cylindrical shape, and a pair of covers 12, 13 having substantially disk shapes, which close openings on both axial ends of this housing main body 11, forming a housing space 14 inside.

The rotor 2 comprises a rotor shaft 21 and a rotor core 22. The rotor shaft 21 is disposed along the center axis of the housing 1, and both ends thereof are rotatably supported to the covers 12, 13 via a pair of axle bearings 25, 26. The covers 12, 13 comprise a pair of annular protrusions 12a, 13a, which protrude in an annular shape in the axial direction toward the housing space 14, and the outer perimeters of the axle bearings 25, 26 are supported by the inner perimeters of these annular protrusions 12a, 13a.

The rotor core 22 is fixed to the outer perimeter of the rotor shaft 21 in a state in which a plurality of metal plates are layered in the axial direction, and the two end portions thereof in the axial direction are supported by a pair of end plates 22e, 22e. The dynamo-electric machine A of the first embodiment is a permanent magnet type synchronous motor, and the rotor core 22 comprises therein a plurality of permanent magnets 22a spaced apart in the circumferential direction.

The stator 3 comprises a stator core 31. This stator core 31 is disposed via an air gap from the outer perimeter of the rotor core 22, and is fixed to the inner perimeter of the housing main body 11. In addition, the stator core 31 comprises a plurality of teeth on the inner perimeter thereof, a coil 32 is wound around each tooth, and coil ends 32e are disposed on the outer sides of the two axial ends of the stator core 31. The stator core 31 is configured by layering a large number of ring-shaped steel plates in the axial direction of the rotor shaft 21.

The dynamo-electric machine A configured as described above is capable of functioning as an electric motor by energizing the coil 32, as well as functioning as a generator that generates electric power using the driving force that is transmitted from the outside to the dynamo-electric machine A.

Next, the cooling structure in the dynamo-electric machine A will be described. The rotor 2 is provided with a refrigerant supply path 4 for supplying refrigerant liquid from the outside of the dynamo-electric machine A. That is, the dynamo-electric machine A is a structure for cooling the permanent magnet 22a and the coil end 32e. Cooling oil can be used as the refrigerant liquid, but no limitation is imposed thereby.

In addition, the refrigerant liquid is supplied and discharged with respect to the dynamo-electric machine A using a pump, which is not shown.

The refrigerant supply path 4 comprises a rotational axis flow path 41, a radial flow path 42, and a rotor axial flow path 43. The rotational axis flow path 41 extends in the axial direction along the center axis of the rotor shaft 21 from a refrigerant inlet 41a at one end of the rotor shaft 21, and the distal end thereof in the extending direction is disposed substantially in the central position of the rotor core 22 in the axial direction.

Figure 2:
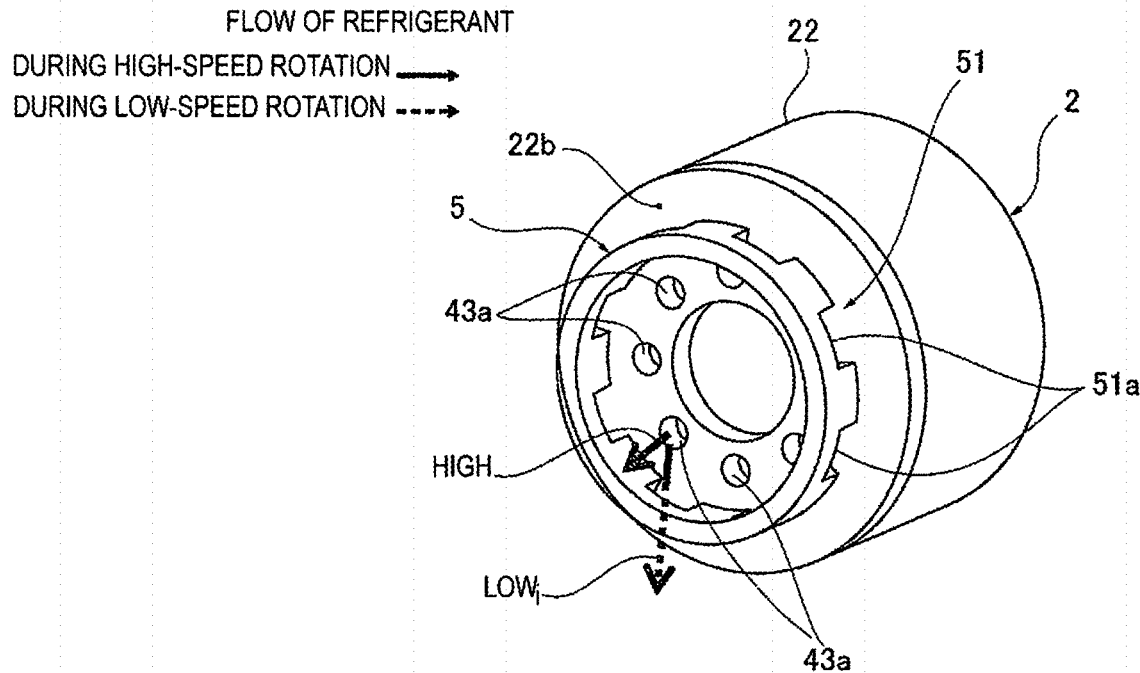
FIG. 2 is a perspective view illustrating the main parts of the dynamo-electric machine provided with the cooling structure for a dynamo-electric machine according to the first embodiment.

The radial flow path 42 extends radially outward from the distal end of the rotational axis flow path 41, through the rotor shaft 21, to a radially intermediate position of the rotor core 22, and a plurality thereof are formed spaced apart in the circumferential direction. The rotor axial flow path 43 extends from the radially outward distal end of each radial flow path 42, and extends along the axial direction to the two axial side end surfaces 22b, 22b of the rotor core 22, and opens refrigerant outlets 43a at the two axial end surfaces 22b, 22b of the rotor core 22. The refrigerant outlets 43a are provided at substantially equal intervals in the circumferential direction at the two axial side end surfaces 22b, 22b of the rotor core 22, as illustrated in FIG. 2.

When the rotor 2 is rotated, the refrigerant liquid supplied to the refrigerant supply path 4 from the refrigerant inlet 41a illustrated in FIG. 1 is splashed from the refrigerant outlets 43a toward the coil ends 32e in the outer diameter direction. In the housing space 14, the portions where the refrigerant liquid is splashed from the refrigerant outlets 43a to the coil ends 32e in this manner are the refrigerant splash paths 14a. That is, a refrigerant splash path 14a is the space sandwiched between the two side end surfaces 22b, 22b of the rotor core 22 and the annular protrusions 12a, 13a of the covers 12, 13 in the direction along the axial direction, and between a refrigerant outlet 43a and a coil end 32e in the radial direction.

The refrigerant liquid that is splashed through this refrigerant splash path 14a falls inside the housing space 14, is returned to an oil tank, which is not shown, through discharge holes 11c, 11c formed in the housing main body 11, subjected to heat dissipation using a radiator, or the like, which is not shown, and is returned to the refrigerant supply path 4 from the refrigerant inlet 41a.

Furthermore, the cooling structure of the first embodiment is provided with a blocking wall member 5 that shields a part of the refrigerant liquid that splashes radially outward from the refrigerant outlets 43a toward the coil ends 32e in the refrigerant splash path 14a. In the first embodiment, the blocking wall member 5 is fixed to the covers 12, 13. This blocking wall member 5 is formed in an annular shape in the portion on the farther side from the side end surface 22b, as illustrated in FIG. 2, and shields the refrigerant splash path 14a across the entire circumference.

On the other hand, on the side closer to the side end surface 22b, the blocking wall member 5 forms communication passages 51 that connect the refrigerant outlet 43a side and the coil end 32e side, as illustrated in FIG. 1. That is, the communication passages 51 are formed by the gap between the axial end surface of the blocking wall member 5 on the rotor core 22 side and the side end surface 22b of the rotor core 22, and communication recesses 51a formed in the blocking wall member 5, as illustrated in FIG. 2. The communication recesses 51a are provided at the end portion of the blocking wall member 5 on the rotor core 22 side, at constant intervals in the circumferential direction, and the blocking wall member 5 has a convex/concave shape, as illustrated in FIG. 2.

Therefore, the blocking wall member 5 shields the refrigerant outlets 43a toward the outer diameter direction across the entire circumference at a position away from the two side end surfaces 22b, 22b of the rotor core 22 in the axial direction, and the shielding area is large and the shielding degree is high with respect to the coil ends 32e in the outer diameter direction. On the other hand, at a position near the two side end surfaces 22b, 22b of the rotor core 22 in the axial direction, the blocking wall member 5 comprises communication passages 51 having large communication cross-sectional areas on the side close to the side end surface 22b, and the shielding area is small and the shielding degree is low with respect to the coil ends 32e in the outer diameter direction.

Next, the action of the first embodiment will be described. When driving the dynamo-electric machine A, refrigerant is supplied to the refrigerant inlet 41a of the refrigerant supply path 4. The refrigerant liquid supplied to this refrigerant supply path 4 splashes from the refrigerant outlets 43a through the refrigerant splash paths 14a in the outer diameter direction by the centrifugal force that acts due to rotation of the rotor 2. Then, the refrigerant liquid splashed through the refrigerant splash paths 14a carries out heat exchange with and cools the permanent magnet 22a of the rotor 2 and the coil 32 of the stator 3, and is then discharged from the discharge holes 11 c of the housing main body 11. The dynamo-electric machine A is cooled by this circulation of the refrigerant liquid.

In the dynamo-electric machine A, the parts that are likely to generate heat change between the permanent magnet 22a of the rotor 2 and the coil 32 of the stator 3, depending on the rotational speed of the rotor 2. In general, during low-speed rotation, it is often desirable to obtain a high output torque. In such a case, the current that is caused to flow in the coil 32 is increased, which increases copper loss, and the coil 32 is likely to generate heat. On the other hand, during high-speed rotation, the magnetic flux that crosses the permanent magnet 22a is replaced more frequently, which increases hysteresis loss and eddy current loss, i.e., iron loss, and the permanent magnet 22a enters into a state more likely to generate heat.

Therefore, in the first embodiment, the location to be cooled is switched by changing the supply rate of the coolant between the permanent magnet 22a of the rotor 2 and the coil 32 of the stator 3, based on the shielding characteristics of the blocking wall member 5.

The operation of switching the supply rate of the refrigerant liquid to the rotor core 22 and the coil end 32e, depending on the rotational speed of the dynamo-electric machine A described above in the first embodiment, will be described below. During low-speed rotation of the rotor 2, the centrifugal force that acts on the refrigerant liquid that splashes from the refrigerant outlets 43a is relatively small compared to that during high-speed rotation, and the flow rate of the refrigerant liquid that splashes from the refrigerant outlets 43a is also low. In this case, the rate at which the refrigerant liquid that splashes from the refrigerant outlets 43a passes a position close to the two side end surfaces 22b, 22b of the rotor 2 in the axial direction increases, as indicated by the dotted arrow LOW in FIG. 2, and the rate at which the refrigerant liquid passes a position far from the two side end surfaces 22b, 22b decreases, as indicated by the solid arrow HIGH.

Therefore, during low-speed rotation of the rotor 2, the proportion of the refrigerant liquid that splashes from the refrigerant outlets 43a that is not shielded by the blocking wall member 5 and that passes through the communication passages 51 toward the coil ends 32e is higher than during high-speed rotation, and the rate that is shielded by the blocking wall member 5 is lower than during high-speed rotation. Therefore, the coil ends 32e are cooled relatively more efficiently than the rotor core 22.

Conversely, during high-speed rotation of the rotor 2, the centrifugal force that acts on the refrigerant liquid that splashes from the refrigerant outlets 43a is relatively high compared to that during low-speed rotation, and the flow rate of the refrigerant liquid that splashes from the refrigerant outlets 43a is made to be high. In this case, the rate at which the refrigerant liquid that splashes from the refrigerant outlets 43a passes a position close to the two side end surfaces 22b, 22b of the rotor 2 in the axial direction decreases, as indicated by the dotted arrow LOW in FIG. 2, and the rate at which the refrigerant liquid passes a position far from the two side end surfaces 22b, 22b increases, as indicated by the solid arrow HIGH.

Therefore, during high-speed rotation of the rotor 2, the proportion of the refrigerant liquid that splashes from the refrigerant outlets 43a that passes through the communication passages 51 is lower than during low-speed rotation, and the rate that is shielded by the blocking wall member 5 increases compared to that during low-speed rotation. Therefore, the supply rate to the coil ends 32e is reduced, and the supply rate to the rotor core 22 and the permanent magnet 22a is increased. Thereby, the amount of heat received from the coil ends 32e is reduced, the temperature of the refrigerant liquid supplied to the rotor core 22 and the permanent magnet 22a is suppressed, and the rotor core 22 and the permanent magnet 22a are efficiently cooled.

In addition, by providing a blocking wall member 5, the flow rate of the refrigerant liquid (oil) that flows from the refrigerant outlets 43a radially outward when the rotor 2 is rotated is limited, and the amount of refrigerant liquid on the inner diameter side of the blocking wall member 5 is increased compared to when a blocking wall member 5 is not provided. Accordingly, the supply amount of the coolant (oil) to the axle bearings 25, 26 is increased and the lubricating property can be enhanced; in particular, the supply amount is increased during high-speed rotation, and the lubrication property can be further enhanced.

As described above, the heat generating parts of the dynamo-electric machine A can be efficiently cooled by varying the shielding rate of the blocking wall member 5 of the refrigerant that splashes radially outward from the refrigerant outlets 43a according to the rotational speed of the rotor 2. Such a difference in the supply rate of the refrigerant to the inside and the outside of the blocking wall member 5 in accordance with the rotational speed of the rotor 2 can be achieved using a simple structure in which a blocking wall member 5 is simply provided between the refrigerant outlets 43a of the rotor 2 and the coil ends 32e of the stator 3. Therefore, it is possible to provide a cooling structure for a dynamo-electric machine that is capable of inexpensively and efficiently cooling a dynamo-electric machine A.

The effects of the first embodiment will be listed below.

1) The cooling structure for a dynamo-electric machine according to the first embodiment comprises a refrigerant supply path 4 for introducing refrigerant into a rotor 2 of a dynamo-electric machine A, and refrigerant outlets 43a that are opened to the refrigerant supply path 4 such that the refrigerant splashes toward coil ends 32e of a stator 3 as the rotor 2 is rotated, wherein a blocking wall member 5, which shields a part of the refrigerant that splashes from the refrigerant outlets 43a when the rotor 2 is rotated, is provided in a refrigerant splash path 14a between the refrigerant outlets 43a and the coil ends 32e, and the rate at which the blocking wall member 5 shields the coil ends 32e against the refrigerant is low during low-speed rotation and high during high-speed rotation of the rotor 2.

Therefore, using a simple and inexpensive configuration in which a blocking wall member 5 is simply provided, and the shielding rate thereof is changed between during low-speed rotation and during high-speed rotation, it is possible to efficiently cool the coil ends 32e during low-speed rotation of the rotor 2, and to efficiently cool the rotor core 22 during high-speed rotation of the rotor 2. Therefore, it is possible to inexpensively and efficiently cool a dynamo-electric machine.

2) In the cooling structure for a dynamo-electric machine according to the first embodiment,
the refrigerant outlets 43a are provided on two axial side end surfaces 22b, 22b of a rotor core 22 of the rotor 2, and
the blocking wall member 5 is configured such that communication passages 51 that connect the refrigerant outlet 43a side and the coil end 32e side are formed in the refrigerant splash path 14a, and that the cross-sectional area of the communication passage 51 is formed larger on the side end surface 22b side of the rotor core 22 than on the side far from the side end surface 22b of the rotor core 22.

Therefore, the action and effect of 1) described above can be obtained using a simple configuration in which communication passages 51 formed to have a larger cross-sectional area on the side end surface 22b side of the rotor core 22 are provided to the blocking wall member 5.

3) In the cooling structure for a dynamo-electric machine according to the first embodiment,
a blocking wall is formed from covers 12, 13 in a housing 1 of a dynamo-electric machine A forming the side surfaces of the refrigerant splash path 14a and a blocking wall member 5 that is a separate body from the rotor core 22.

Therefore, compared to a case in which the blocking wall is integrally formed with one of the housing 1 and the rotor core 22, manufacture is made easy, and setting of the cross-sectional area of the communication passages 51 and the shielding area in the refrigerant splash path 14a is made easy.

Other Embodiments

Next, the cooling structure for a dynamo-electric machine of other embodiments will be described. Since the other embodiments are modified examples of the first embodiment, configurations shared with the first embodiment are given the same reference symbols as the first embodiment and the descriptions thereof are omitted, while describing only the differences from the first embodiment.

Second Embodiment

Figure 3:
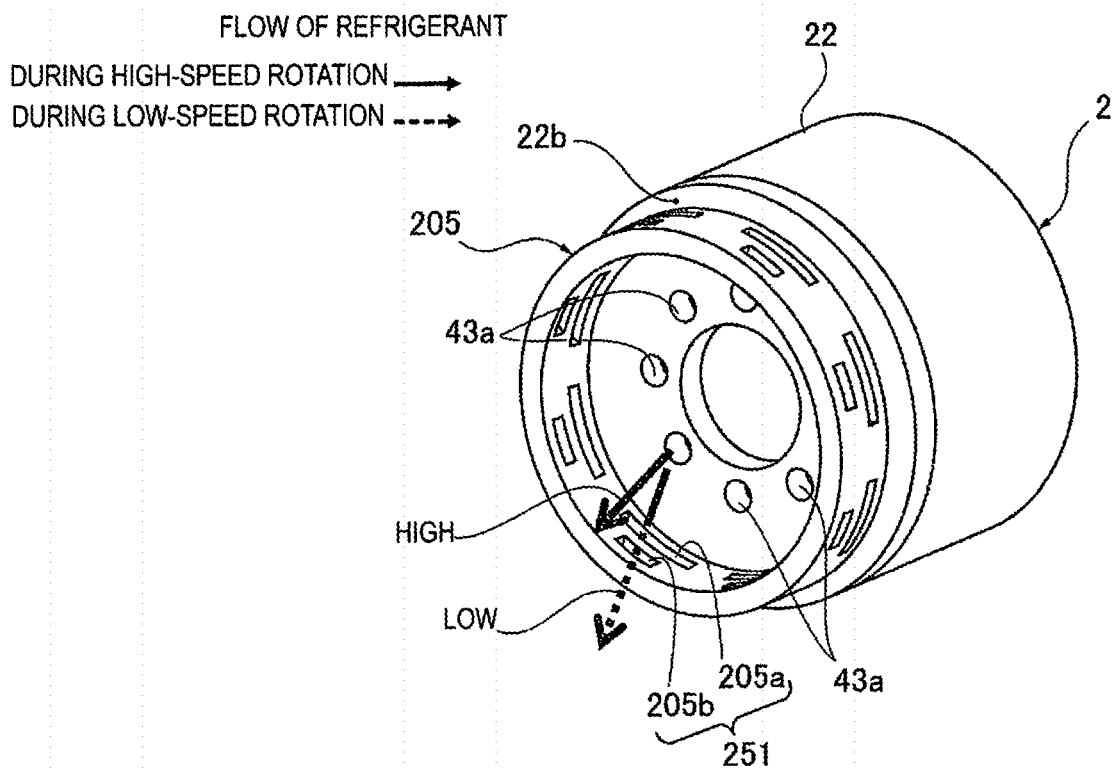
FIG. 3 is a perspective view illustrating the main parts of the dynamo-electric machine provided with the cooling structure for a dynamo-electric machine according to the second embodiment.

The cooling structure for a dynamo-electric machine according to the second embodiment will be described. FIG. 3 is a perspective view illustrating a rotor 2 and a blocking wall member 205 of the cooling structure for a dynamo-electric machine according to the second embodiment, and, as shown, the shape of the blocking wall member 205 is different from the shape of the blocking wall member 5 according to the first embodiment.

That is, the blocking wall member 205 is formed in an annular shape across the entire circumference. In addition, the blocking wall member 205 comprises, as communication passages, a plurality of first communication holes 205a and second communication holes 205b, which are formed extending through the blocking wall member 205 and are respectively disposed at constant intervals in the circumferential direction.

Furthermore, the first communication holes 205a are disposed on the side close to the side end surface 22b of the rotor core 22 with respect to the second communication holes 205b and are formed to have a longer shape in the circumferential direction than the second communication holes 205b. As a result, the blocking wall member 205 is configured such that the cross-sectional area of the communication passages 251, which connect the refrigerant outlet 43a side and the coil end 32e side, is formed larger on the side close to the end surface 22b of the rotor core 22 than on the far side.

Therefore, during low-speed rotation of the rotor 2, the proportion of the refrigerant liquid that splashes from the refrigerant outlets 43a that passes through the first and second communication holes 205a, 205b as indicated by the dotted arrow LOW and heads toward the coil ends 32e is made to be higher than during high-speed rotation, and the coil ends 32e can be efficiently cooled.

On the other hand, during high-speed rotation of the rotor 2, the proportion of the refrigerant liquid that splashes from the refrigerant outlets 43a that is shielded by the blocking wall member 205 as indicated by the solid arrow HIGH in FIG. 3 is made to be higher than during low-speed rotation, and the rotor core 22 and the permanent magnet 22a can be efficiently cooled. Therefore, the same effects as 1)-3) described above can be obtained, even with the cooling structure for a dynamo-electric machine according to the second embodiment.

Third Embodiment

Figure 4:
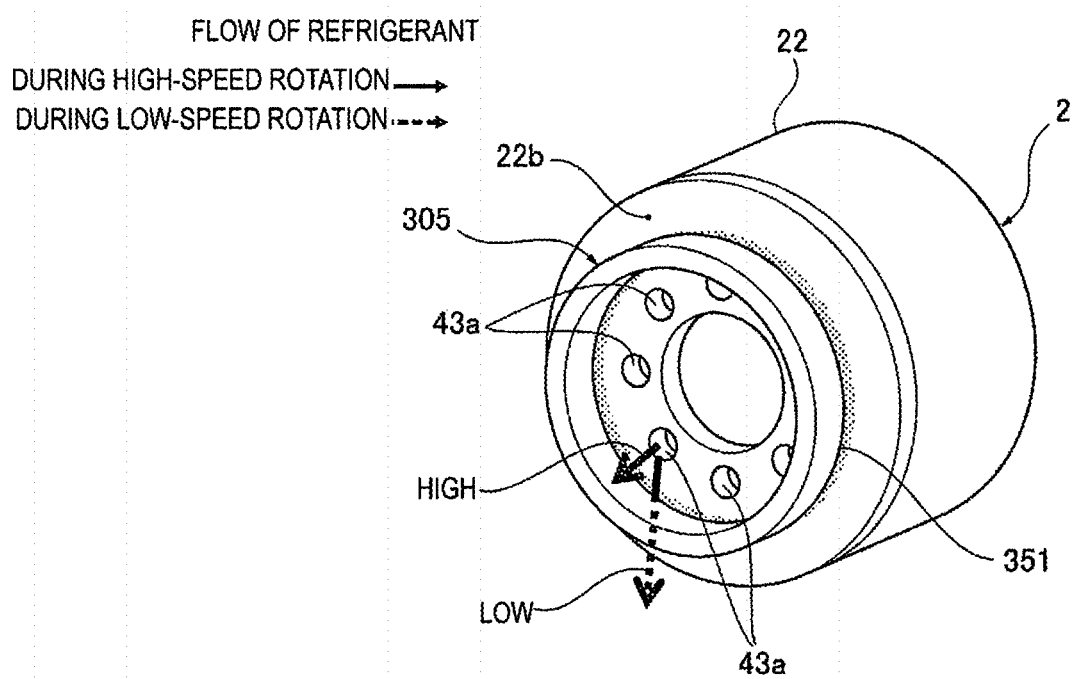
FIG. 4 is a perspective view illustrating the main parts of the dynamo-electric machine provided with the cooling structure for a dynamo-electric machine according to the third embodiment.

The cooling structure for a dynamo-electric machine according to the third embodiment will be described. FIG. 4 is a perspective view illustrating a rotor 2 and a blocking wall member 305 of the cooling structure for a dynamo-electric machine according to the third embodiment, and, as shown, the shape of the blocking wall member 305 is different from the shape of the blocking wall member 5 according to the first embodiment. This blocking wall member 305 is formed in an annular shape across the entire circumference. Then, a communication passage 351 that allows refrigerant liquid to flow through is formed between a distal end surface of the blocking wall member 305 in the direction along the axial direction of the rotor shaft 21 and the side end surface 22b of the rotor core 22 that is opposed thereto.

Therefore, during low-speed rotation of the rotor 2, the proportion of the refrigerant liquid that splashes from the refrigerant outlets 43a that passes through the communication passage 351 between the side end surface 22b of the rotor 2 and the distal end surface of the blocking wall member 305 becomes higher than during high-speed rotation, as indicated by the dotted arrow LOW in FIG. 4.

Therefore, of the refrigerant liquid that splashes from the refrigerant outlets 43a, the supply rate to the coil ends 32e increases, and the coil ends 32e can be efficiently cooled.

On the other hand, during high-speed rotation of the rotor 2, the proportion that passes through a position away from the rotor 2 in the axial direction increases, and the rate that is shielded by the blocking wall member 305 is increased, as indicated by the solid arrow HIGH in FIG. 4. Accordingly, of the refrigerant liquid that splashes from the refrigerant outlets 43a, the proportion of the flow rate that passes through the blocking wall member 305 and flows toward the outer diameter direction decreases compared to during low-speed rotation, and the rate that is supplied to the rotor core 22 is increased, thereby efficiently cooling the rotor core 22 and the permanent magnet 22a. Therefore, the same effects as 1)-3) described above can be obtained, even with the cooling structure for a dynamo-electric machine according to the third embodiment.

Fourth Embodiment

Figure 5:
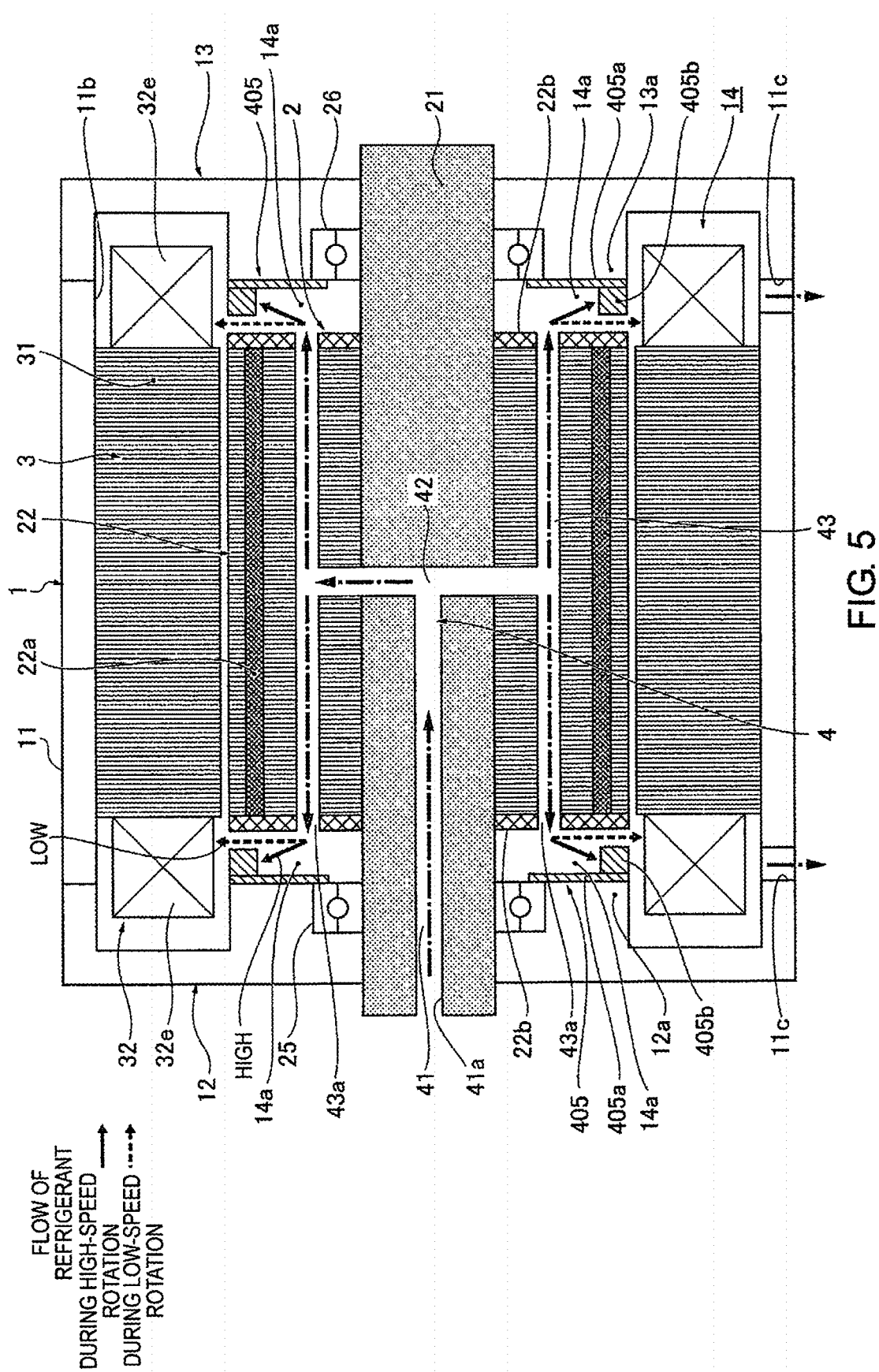
FIG. 5 is a cross-sectional view of a dynamo-electric machine provided with the cooling structure for a dynamo-electric machine according to the fourth embodiment.

The cooling structure for a dynamo-electric machine according to the fourth embodiment will be described. FIG. 5 is a cross-sectional view of a dynamo-electric machine provided with the cooling structure for a dynamo-electric machine according to the fourth embodiment, and, as shown, the shape of the blocking wall member 405 is different from the shape of the blocking wall member 5 according to the first embodiment.

The blocking wall member 405 comprises a base plate 405a and an annular wall portion 405b. The base plate 405a is formed in a disk shape, and is fixed to the distal end surfaces of the annular protrusions 12a, 13a of the covers 12, 13. The annular wall portion 405b is formed in an annular shape, and is integrally joined to the outer perimeter portion of the base plate 405a. The shape of this annular wall portion 405b may be any of the shapes of the blocking wall members 5, 205, 305 illustrated in the first to the third embodiments. Therefore, in addition to the effects of the first to the third embodiments described above, the fourth embodiment exerts the effect that the supporting strength of the blocking wall member 405 in the covers 12, 13 can be improved.

Fifth Embodiment

Figure 6:
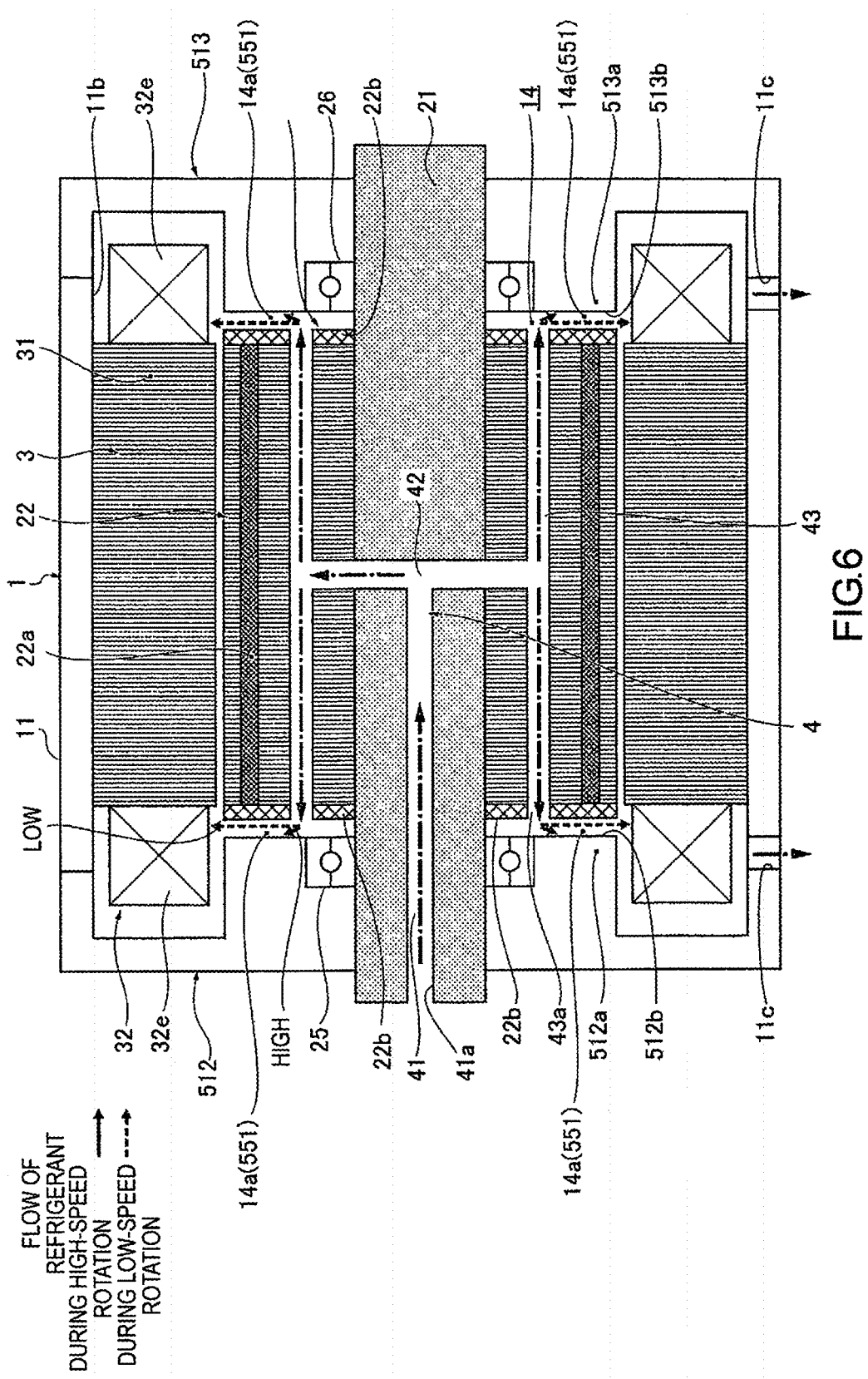
FIG. 6 is a cross-sectional view of a dynamo-electric machine provided with the cooling structure for a dynamo-electric machine according to the fifth embodiment.

The cooling structure for a dynamo-electric machine according to the fifth embodiment will be described. The fifth embodiment is an example in which the blocking wall is integrally formed with the housing 1. FIG. 6 is a cross-sectional view of a dynamo-electric machine provided with the cooling structure for a dynamo-electric machine according to the fifth embodiment, and annular protrusions 512a, 513a of covers 512, 513, which constitute the housing 1, are used as blocking walls.

That is, the distal end surfaces 512b, 513b of the annular protrusions 512a, 513a are arranged closer to the two side end surfaces 22b, 22b of the rotor 2, compared to the first embodiment. Then, the refrigerant splash path 14a positioned between the two is used as a communication passage 551 that connects the refrigerant outlet 43a side and the coil end 32e side.

Therefore, during low-speed rotation of the rotor 2, the refrigerant liquid that splashes from the refrigerant outlets 43a passes a position near the distal end surfaces 512b, 513b of the annular protrusions 512a, 513a as indicated by the arrow LOW, in the same manner as in the first embodiment. Accordingly, of the refrigerant liquid that splashes from the refrigerant outlets 43a, the proportion thereof that passes through the communication passage 551 and heads toward the coil ends 32e is high, as indicated by the dotted arrow LOW, and the proportion that heads from the refrigerant outlets 43a toward the distal end surfaces 512b, 513b in an oblique axial direction is low, as indicated by the solid arrow HIGH. Accordingly, during low-speed rotation of the rotor 2, the coil ends 32e are more efficiently cooled than the rotor 2.

On the other hand, during high-speed rotation of the rotor 2, the proportion that passes through the communication passage 551 and heads toward the coil ends 32e is low, as indicated by the dotted arrow LOW, and the proportion that heads from the refrigerant outlets 43a toward the distal end surfaces 512b, 513b in an oblique axial direction is high, as indicated by the arrow HIGH. Of the refrigerant liquid that splashes from the refrigerant outlets 43a, the rate thereof that is shielded by the annular protrusions 512a, 513a as indicated by the solid arrow HIGH and heads in the inner diameter direction is increased. Accordingly, during high-speed rotation of the rotor 2, the rotor core 22 and the permanent magnet 22a are more efficiently cooled than the coil ends 32e.

Furthermore, in the cooling structure for a dynamo-electric machine according to the fifth embodiment, the blocking wall is integrally formed with the annular protrusions 512a, 513a of the covers 512, 513, which constitute the housing 1 of the dynamo-electric machine, forming the side surface of the refrigerant splash path 14a. Since an independent blocking wall member is not used as the blocking wall, it is possible to reduce the number of parts and to achieve a reduction in cost.

Sixth Embodiment

Figure 7:
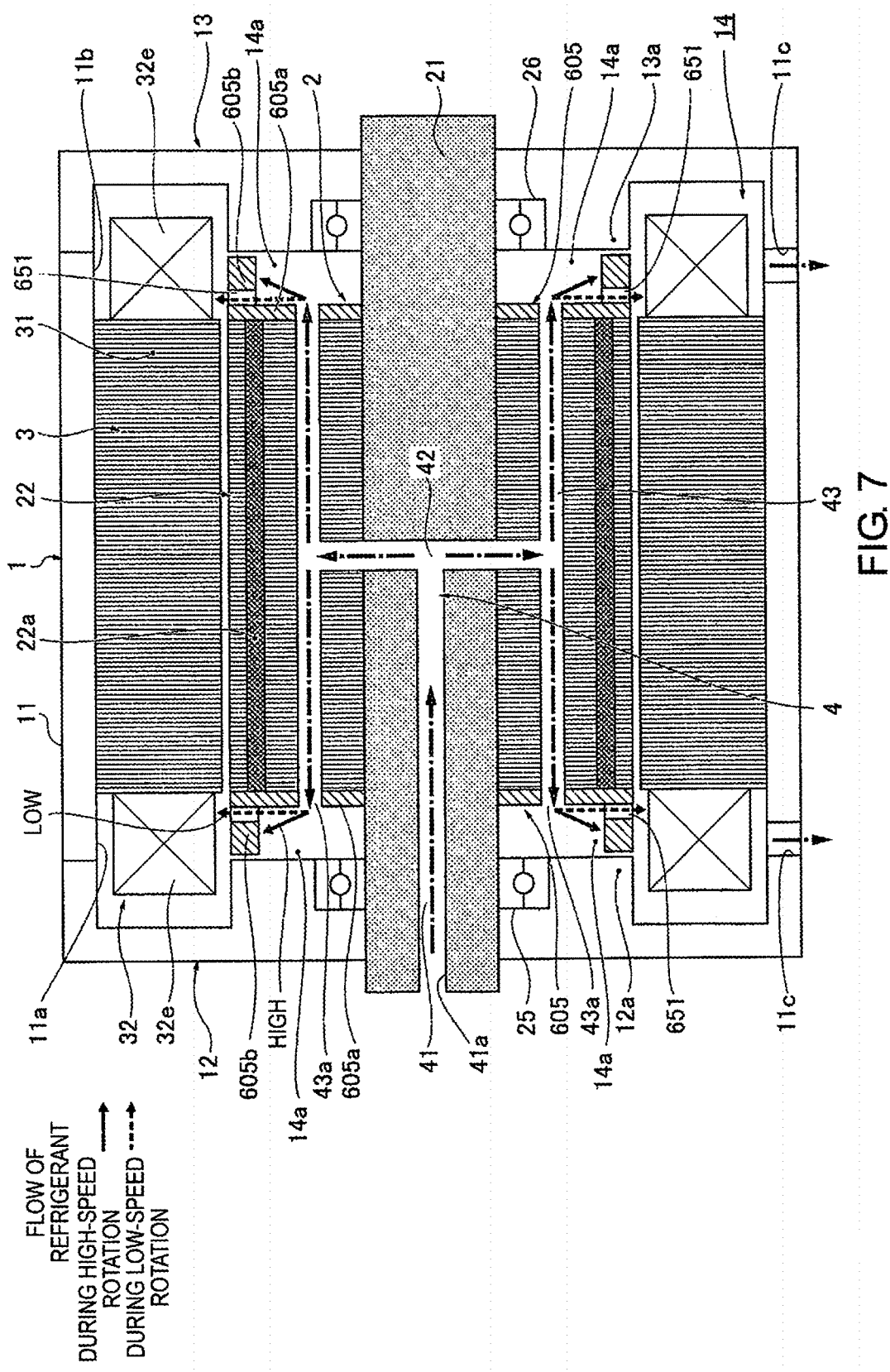
FIG. 7 is a cross-sectional view of a dynamo-electric machine provided with the cooling structure for a dynamo-electric machine according to the sixth embodiment.

The cooling structure for a dynamo-electric machine according to the sixth embodiment will be described. FIG. 7 is a cross-sectional view of a dynamo-electric machine to which is applied the cooling structure for a dynamo-electric machine according to the sixth embodiment, and this sixth embodiment is an example in which a blocking wall member 605 is provided to the rotor 2. This blocking wall member 605 comprises a base plate 605a and an annular wall portion 605b. The base plate 605a is formed in a disc shape, and is provided to both axial ends of the rotor core 22, also serving as an end plate.

The annular wall portion 605b has an annular shape, is integrally joined along the outer peripheral edge portion of the base plate 605a, and is disposed proximate to the annular protrusions 12a, 13a of the covers 12, 13 such that the distal end surface thereof shields the space between the refrigerant outlets 43a and the coil ends 32e. Furthermore, in the annular wall portion 605b are formed communication passages 651 that connect the refrigerant outlet 43a side and the coil end 32e side in the refrigerant splash path 14a, by holes formed at a constant interval in the circumferential direction, in the same manner as the first and second communication holes 205a, 205b shown in the second embodiment.

Therefore, also in this sixth embodiment, during low-speed rotation of the rotor 2, the proportion of the refrigerant liquid that splashes from the refrigerant outlets 43a that passes through the communication passages 651 and heads toward the coil ends 32e as indicated by the dotted arrow LOW is made to be high. On the other hand, during high-speed rotation of the rotor 2, the proportion of the refrigerant liquid that splashes from the refrigerant outlets 43a that is shielded by the annular wall portion 605b as indicated by the solid arrow HIGH and heads toward the inner diameter direction is made to be high.

Therefore, the effects of 1)-3) described above can also be obtained using this sixth embodiment. Furthermore, in the sixth embodiment, since the base plate 605a of the blocking wall member 605 also serves as the end plate of the rotor core 22, it is possible to reduce the number of parts.

Seventh Embodiment

Figure 8:
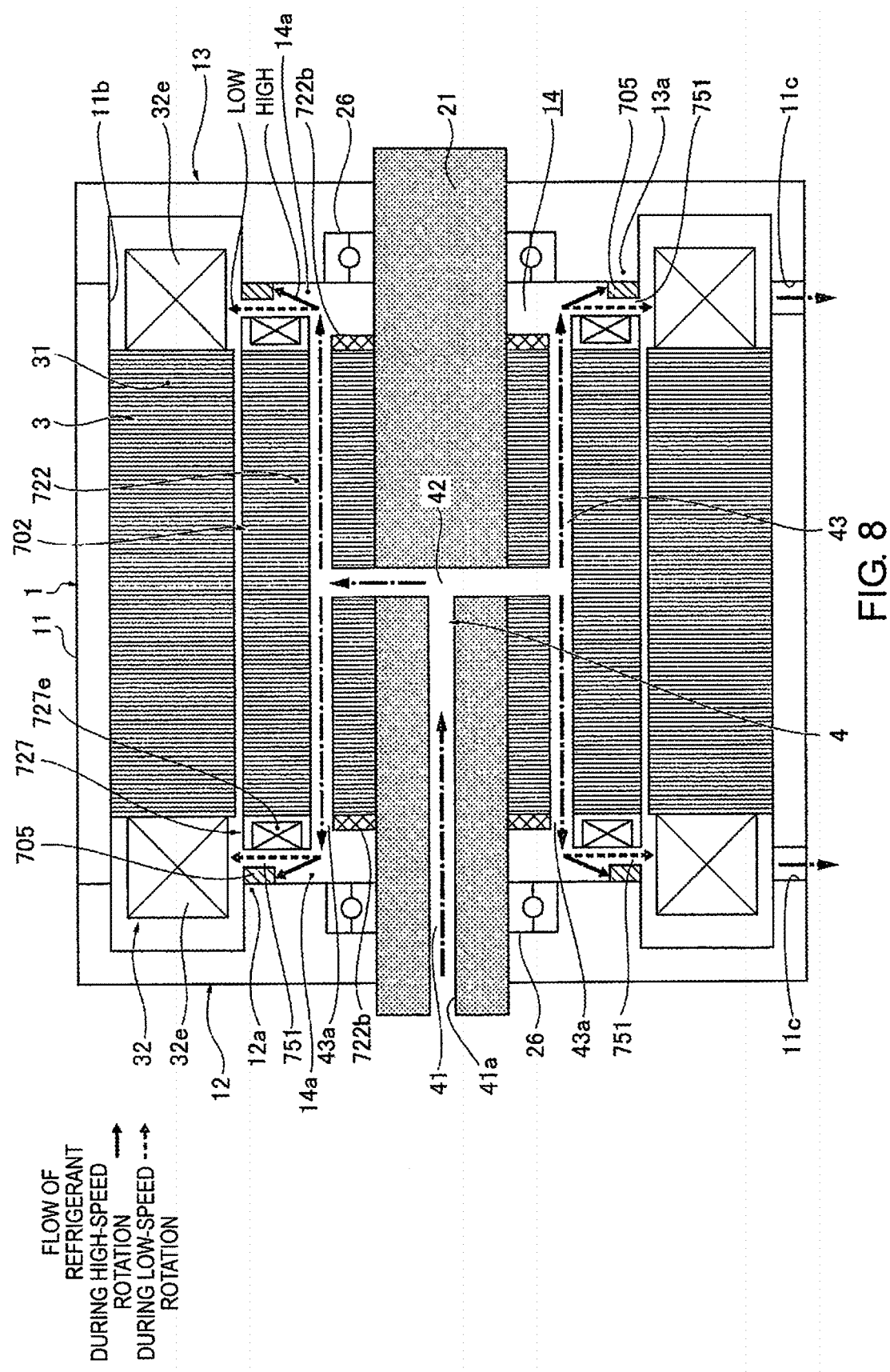
FIG. 8 is a cross-sectional view of a dynamo-electric machine provided with the cooling structure for a dynamo-electric machine according to the seventh embodiment.

The cooling structure for a dynamo-electric machine according to the seventh embodiment will be described. FIG. 8 is a cross-sectional view of a dynamo-electric machine to which is applied the cooling structure for a dynamo-electric machine according to the seventh embodiment. In this seventh embodiment, the structure of the dynamo-electric machine to which is applied the cooling structure for a dynamo-electric machine is different from the first embodiment, and a so-called winding field type dynamo-electric machine is used. That is, the rotor core 722 of the rotor 702 comprises a plurality of slots, which are not shown, on the outer perimeter side in the radial direction at equal intervals in the circumferential direction, and coils 727 disposed in the slots are wound around the rotor core 722; the magnetic poles of the rotor 702 are excited by energizing the coils 727. Coil ends 727e are disposed in the edge portions of the two side end surfaces of the rotor core 722 in the outer diameter direction.

The blocking wall member 705 is formed in an annular shape, in the same manner as in the third embodiment, and a communication passage 751 is formed between the distal end surface of the blocking wall member 705, and the side end surface 722b of the rotor core 722 including the coil end 727e facing the distal end surface of the blocking wall member.

Therefore, also in this seventh embodiment, during low-speed rotation of the rotor 2, the proportion of the refrigerant liquid that splashes from the refrigerant outlets 43a that passes through the communication passage 751 and heads toward the coil ends 32e as indicated by the dotted arrow LOW is made to be high. On the other hand, during high-speed rotation of the rotor 2, the proportion of the refrigerant liquid that splashes from the refrigerant outlets 43a that is shielded by the blocking wall member 705 as indicated by the solid arrow HIGH and heads toward the inner diameter direction is made to be high. Therefore, the effects of 1)-3) described above can also be obtained using this seventh embodiment.

Eighth Embodiment

Figure 9:
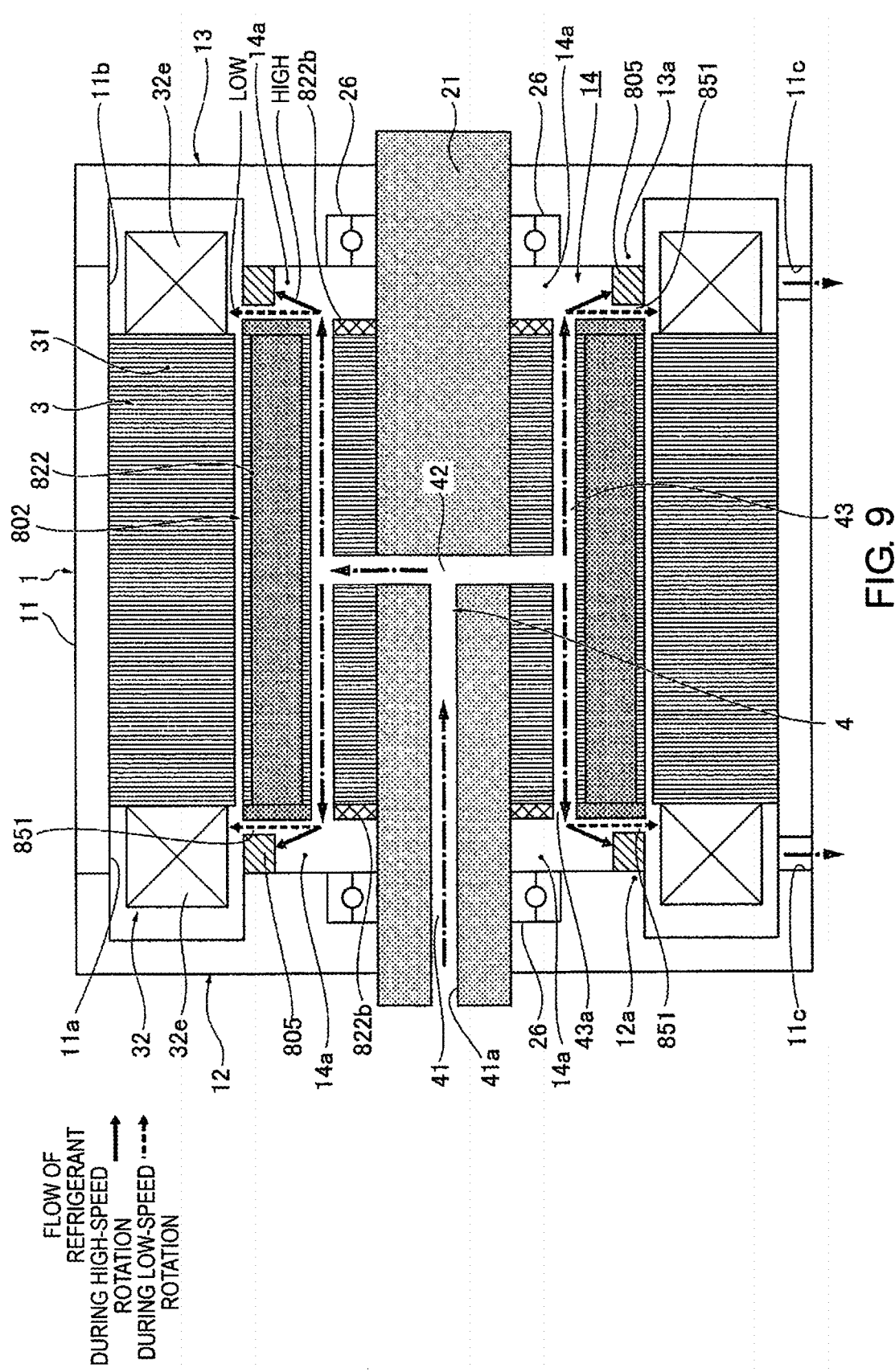
FIG. 9 is a cross-sectional view of a dynamo-electric machine provided with the cooling structure for a dynamo-electric machine according to the eighth embodiment.

The cooling structure for a dynamo-electric machine according to the eighth embodiment will be described. FIG. 9 is a cross-sectional view of a dynamo-electric machine to which is applied the cooling structure for a dynamo-electric machine according to the eighth embodiment, and this eighth embodiment is an example in which a so-called induction type dynamo-electric machine is used. That is, a rotor core 822 of a rotor 802 comprises a plurality of conductor bars 827 on the outer perimeter portion in the radial direction at equal intervals in the circumferential direction, and an induction current is generated in the rotor 802 by the rotating magnetic field formed using the stator 3 to thereby generate a rotational torque.

The blocking wall member 805 is formed in an annular shape, in the same manner as in the third embodiment, and a communication passage 851 is formed between the distal end surface of the blocking wall member 805 and the side end surface 822b of the rotor core 822 including the conductor bar 827 facing the distal end surface of the blocking wall member. Therefore, the same effects as 1)-3) described above can also be obtained by using an induction type dynamo-electric machine, in the cooling structure for a dynamo-electric machine according to the eighth embodiment.

Ninth Embodiment

Figure 10:
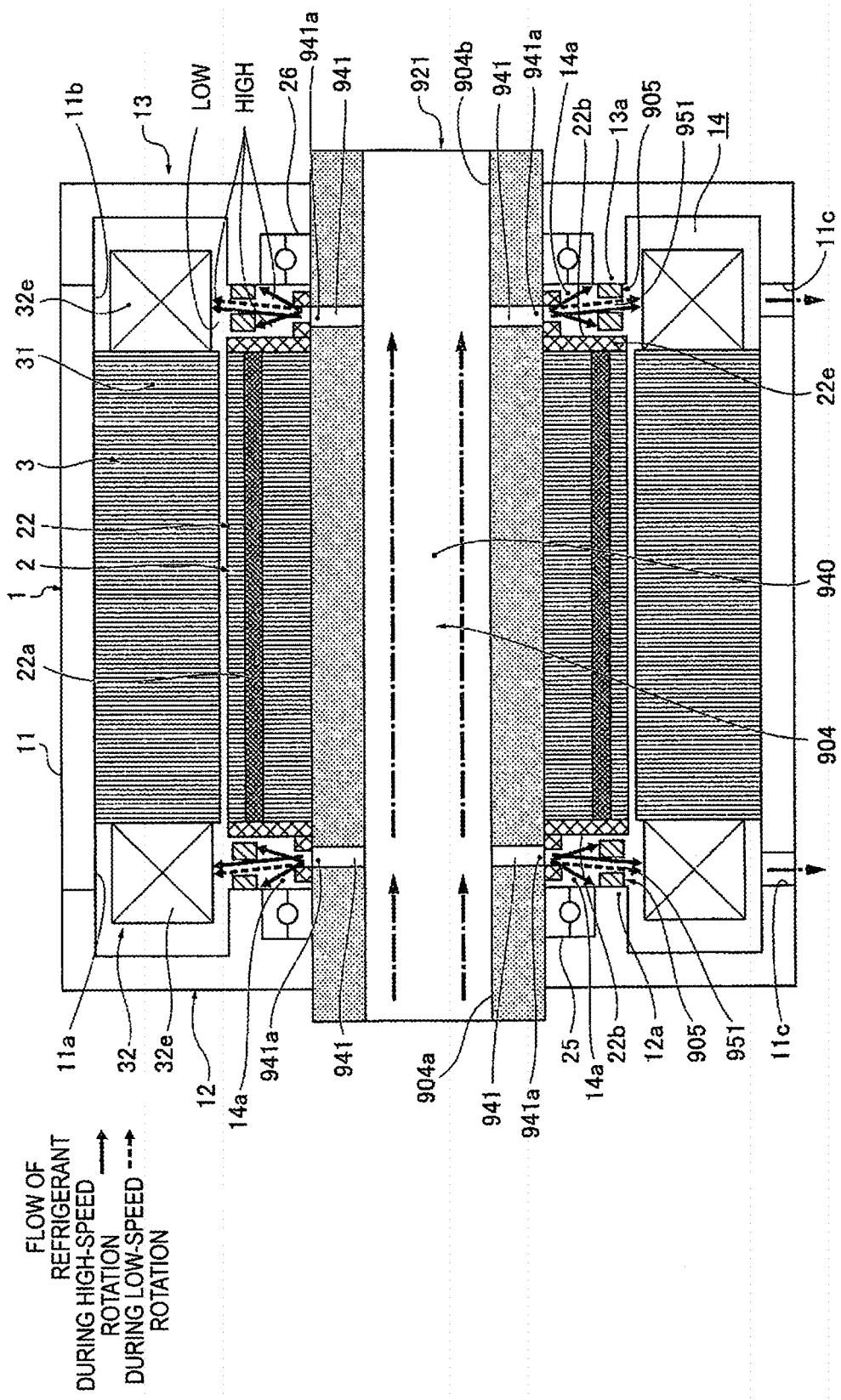
FIG. 10 is a cross-sectional view of a dynamo-electric machine provided with the cooling structure for a dynamo-electric machine according to the ninth embodiment.

The cooling structure for a dynamo-electric machine according to the ninth embodiment will be described. FIG. 10 is a cross-sectional view of a dynamo-electric machine to which is applied the cooling structure for a dynamo-electric machine according to the ninth embodiment. This ninth embodiment is different from the first embodiment in the structures of the refrigerant supply path 904 and the blocking wall member 905. That is, the refrigerant supply path 904 comprises an axial flow path 940 and outlet holes 941. The axial flow path 940 is formed in the axial center position of the rotor shaft 921, across the entire length in the axial direction. In addition, the outlet holes 941 are formed extending through the rotor shaft 921 in a position between the annular protrusions 12a, 13a of the covers 12, 13 and the two side end surfaces 22b, 22b of the rotor core 22 in the axial direction, and connect the axial flow path 940 and the housing space 14. Refrigerant outlets 941a are thereby formed on the outer perimeter surface of the rotor shaft 921.

In addition, the dynamo-electric machine comprises a blocking wall member 905 between the refrigerant outlets 941a and the coil ends 32e. This blocking wall member 905 is formed in an annular shape, and is fixed to the annular protrusions 12a, 13a of the covers 12, 13. Furthermore, the blocking wall member 905 is provided with communication passages 951 in a position opposing the refrigerant outlets 941a. That is, the communication passages 951 are configured by forming a plurality of holes spaced apart in the circumferential direction, extending through the blocking wall member 905 in the radial direction, in the same manner as in the second embodiment.

Therefore, the blocking wall member 905 is configured such that the cross-sectional area of the communication passages 951, which connect the refrigerant outlet 941a side and the coil end 32e side in the refrigerant splash path 14a, is formed large on the front position side of the refrigerant outlet 941a in the outer diameter direction, and formed small on the side away from this position in the axial direction.

Next, the action of the ninth embodiment will be described. In the ninth embodiment, when the rotor 2 is rotated, the refrigerant liquid that is supplied to the axial flow path 940 splashes in the outer diameter direction from the refrigerant outlets 941a. At the time of this splashing, some refrigerant splashes straight in the outer diameter direction, as indicated by the dotted arrow LOW, and some refrigerant splashes obliquely toward the annular protrusions 12a, 13a of the covers 12, 13 and the two side end surfaces 22b, 22b of the rotor core 22, as indicated by the solid arrow HIGH.

During low-speed rotation of the rotor 2, the proportion of the refrigerant that splashes straight in the outer diameter direction from the refrigerant outlets 941a, as indicated by the dotted arrow LOW, is high; accordingly, the proportion of the refrigerant that passes the communication passages 951 of the blocking wall member 905 is high, and the coil ends 32e are efficiently cooled.

On the other hand, during high-speed rotation of the rotor 2, centrifugal force acts more strongly, and the proportion of the refrigerant that splashes obliquely, as indicated by the solid arrow HIGH, increases; therefore, the rate of the refrigerant shielded by the blocking wall member 905 is increased. Accordingly, the supply rate of the refrigerant to the coil ends 32e is reduced, and the supply rate to the rotor core 22 and the permanent magnet 22a is increased. Thereby, the amount of heat received from the coil ends 32e is reduced, the temperature of the refrigerant liquid supplied to the rotor core 22 and the permanent magnet 22a is suppressed, and the rotor core 22 and the permanent magnet 22a are efficiently cooled.

In addition, by providing a blocking wall member 905, the flow rate of the refrigerant liquid (oil) that flows from the refrigerant outlets 941a radially outward when the rotor 2 is rotated is limited, and the amount of refrigerant liquid on the inner diameter side of the blocking wall member 905 is increased compared to when a blocking wall member 905 is not provided. Accordingly, the supply amount of the coolant (oil) to the axle bearings 25, 26 is increased and the lubricating property can be enhanced; in particular, the supply amount is increased during high-speed rotation, and the lubrication property can be further enhanced.

As described above, in the cooling structure for a dynamo-electric machine according to the ninth embodiment, refrigerant outlets 941a are provided on an outer perimeter surface of a rotor shaft 921 that rotatably supports a rotor core 22, and the blocking wall member 905 is configured such that communication passages 951 that connect the refrigerant outlet 941a side and the coil end 32e side are formed in the refrigerant splash path 14a, and that the cross-sectional area of the communication passages 951 is formed larger on a front position side of the refrigerant outlet 941a in the outer diameter direction than on the side away from the front position side in the axial direction.

Therefore, during low-speed rotation of the rotor 2, the proportion of the refrigerant liquid that passes through the communication passages 951 of the blocking wall member 905 is high, and the coil ends 32e are efficiently cooled. On the other hand, during high-speed rotation of the rotor 2, the rate of the refrigerant liquid that is shielded by the blocking wall member 905 is made to be high, and the rotor core 22 and the permanent magnet 22a are efficiently cooled. In addition, in the ninth embodiment, it is possible to obtain the action and effects described above using a simple configuration provided with a blocking wall member 905 having communication passages 951, manufacture is made easy, and setting of the cross-sectional area of the communication passages 951 and the shielding area in the refrigerant splash path 14a is made easy.

Tenth Embodiment

Figure 11:
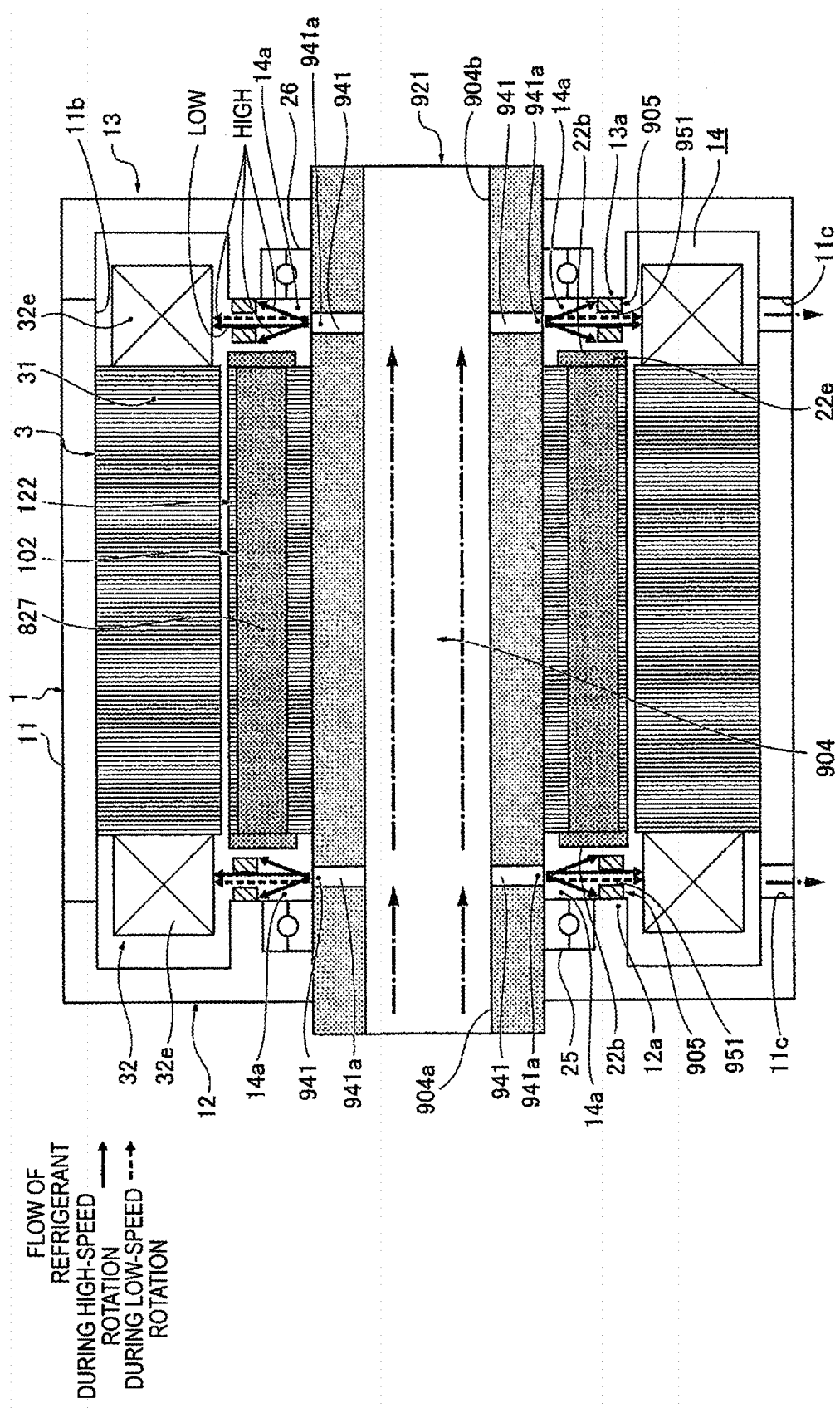
FIG. 11 is a cross-sectional view of a dynamo-electric machine provided with the cooling structure for a dynamo-electric machine according to the tenth embodiment.

The cooling structure for a dynamo-electric machine according to the tenth embodiment will be described. FIG. 11 is a cross-sectional view of a dynamo-electric machine to which is applied the cooling structure for a dynamo-electric machine according to the tenth embodiment. This tenth embodiment is a modified example of the ninth embodiment, and is an example in which a so-called induction type dynamo-electric machine is used. That is, a rotor core 122 of a rotor 102 comprises a plurality of conductor bars 827 on the outer perimeter portion in the radial direction at equal intervals in the circumferential direction, and an induction current is generated in the rotor 102 by the rotating magnetic field formed using the stator 3 to thereby generate a rotational torque. Therefore, in the tenth embodiment, the same action and effects as in the ninth embodiment can be obtained in an induction type dynamo-electric machine.

Eleventh Embodiment

Figure 12:
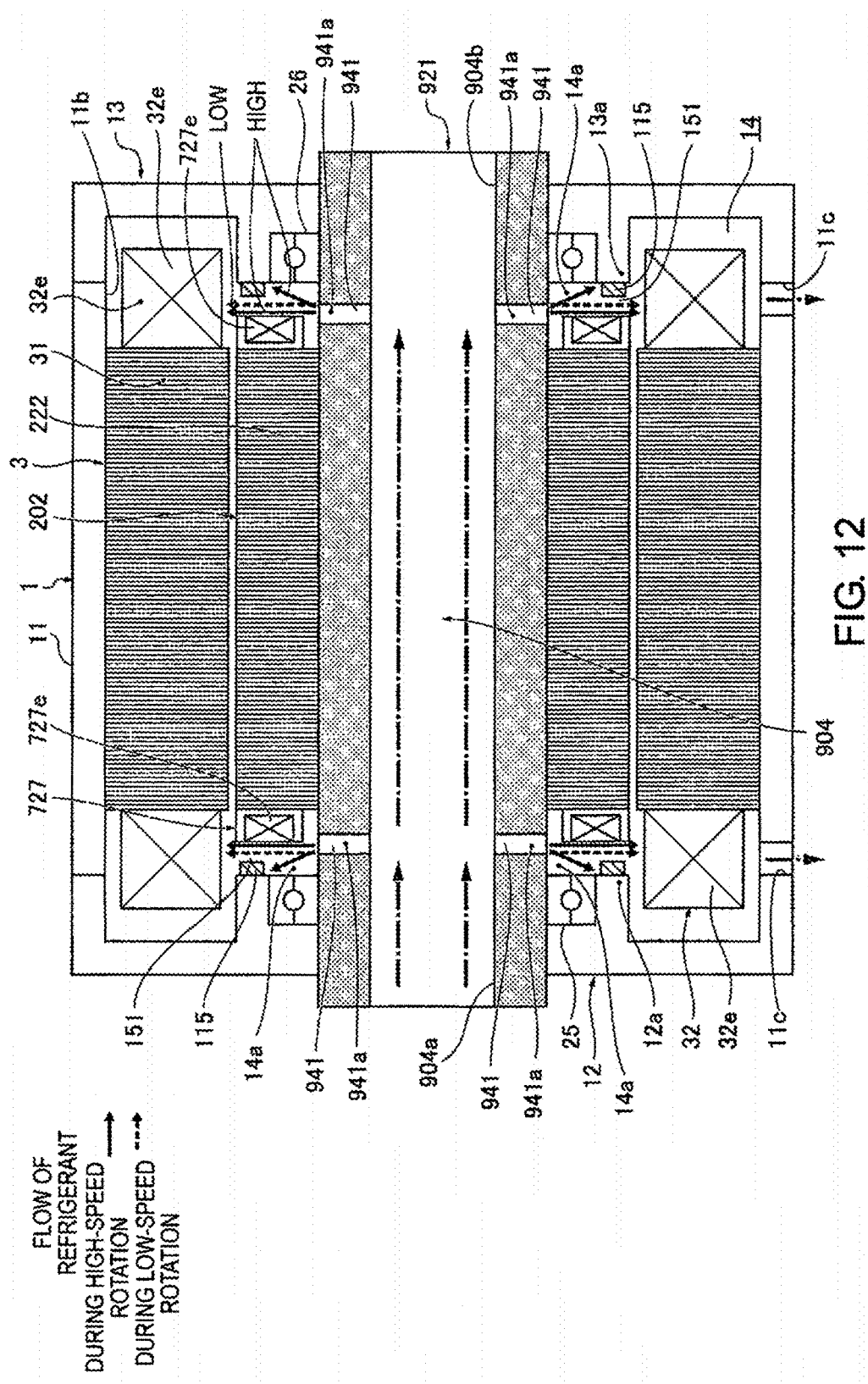
FIG. 12 is a cross-sectional view of a dynamo-electric machine provided with the cooling structure for a dynamo-electric machine according to the eleventh embodiment.

The cooling structure for a dynamo-electric machine according to the eleventh embodiment will be described. FIG. 12 is a cross-sectional view of a dynamo-electric machine to which is applied the cooling structure for a dynamo-electric machine according to the eleventh embodiment. In this eleventh embodiment, the winding field type dynamo-electric machine shown in the seventh embodiment is used as the dynamo-electric machine. That is, the rotor core 222 of the rotor 202 comprises a plurality of slots, which are not shown, on the outer perimeter side in the radial direction at equal intervals in the circumferential direction, and coils 727 disposed in the slots are wound around the rotor core 722; the magnetic poles of the rotor 702 are excited by energizing the coils 727. Coil ends 727e are disposed in the edge portions of the two side end surfaces of the rotor core 222 in the outer diameter direction.

The blocking wall member 115 is formed in an annular shape, and a communication passage 151 is formed between the distal end surface of the blocking wall member 115 and the end surface of the rotor core 222 including the coil end 727e facing the distal end surface of the blocking wall member.

Therefore, also in this eleventh embodiment, during low-speed rotation of the rotor 2, the proportion of the refrigerant liquid that splashes from the refrigerant outlets 43a that passes through the communication passages 151 and heads toward the coil ends 32e as indicated by the dotted arrow LOW is made to be high. On the other hand, during high-speed rotation of the rotor 2, the proportion of the refrigerant liquid that splashes from the refrigerant outlets 43a that is shielded by the blocking wall member 115 as indicated by the solid arrow HIGH and heads toward the inner diameter direction is made to be high. Therefore, the same effects as in the ninth embodiment can also be obtained in this eleventh embodiment.

Twelfth Embodiment

Figure 13:
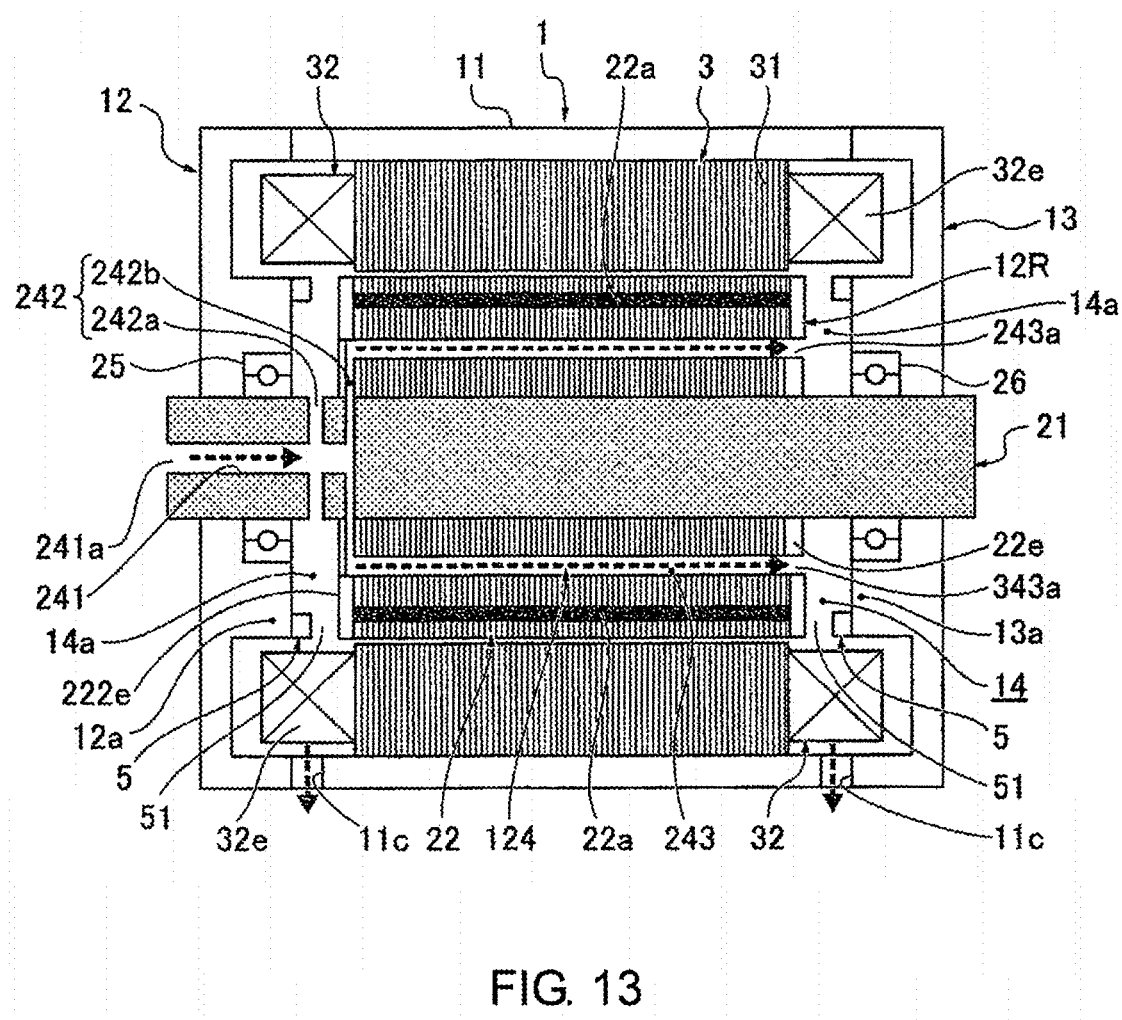
FIG. 13 is a cross-sectional view of a dynamo-electric machine provided with the cooling structure for a dynamo-electric machine according to the twelfth embodiment.

The cooling structure for a dynamo-electric machine according to the twelfth embodiment will be described. FIG. 13 is a cross-sectional view of a dynamo-electric machine to which is applied the cooling structure for a dynamo-electric machine according to the twelfth embodiment. The twelfth embodiment is different from the first embodiment in the structure of the refrigerant supply path 124, and the blocking wall member 5 and the housing 1 are the same as in the first embodiment.

The refrigerant supply path 124 comprises a rotational axis flow path 241, a radial flow path 242, and a rotor axial flow path 243. The rotor axial flow path 243 is formed extending through the rotor core 22 across the entire length in the axial direction, in a position on the radially inner side of the permanent magnet 22a, in the same manner as in the first embodiment. The difference from the first embodiment is the mode of supplying the refrigerant liquid to the rotor axial flow path 243 and supplying the refrigerant liquid from the rotor axial flow path 243 to the housing space 14.

That is, refrigerant outlets 243a, which supply refrigerant liquid from the rotor axial flow path 243 to the housing space 14, are opened only on an end plate 222e on one end in the axial direction (right side in the drawing). The supply of refrigerant liquid to the rotor axial flow path 243 is carried out from the other end in the axial direction (left side in the drawing).

Since refrigerant liquid is supplied to the end portions of the rotor axial flow path 243 in this manner, the configurations of the rotational axis flow path 241 and the radial flow path 242 are different from the first embodiment. The rotational axis flow path 241 is formed from the refrigerant inlet 241a at one end of the rotor shaft 21 (left side end portion in the drawing) to the position of the end plate 222e of the rotor core 22 on the side close to the refrigerant inlet 241a in the axial direction, along the center axis of the rotor shaft 21.

The radial flow path 242 comprises a first radial flow path 242a and a second radial flow path 242b. The first radial flow path 242a is formed extending through the rotor shaft 21 in the radial direction, in a position that overlaps with the refrigerant splash path 14a in the axial direction.

The second radial flow path 242b is formed along the rotor core 22, extending through the rotor shaft 21, in a position that overlaps with the end plate 222e in the axial direction. The portion along the rotor core 22 is formed by forming a groove on the end surface of the end plate 222e. In addition, a plurality of rotor axial flow paths 243, first radial flow paths 242a, second radial flow paths 242b, and refrigerant outlets 243a as described above are formed at substantially equal intervals in the circumferential direction.

Next, the action of the twelfth embodiment will be described. When the rotor 12R is rotated, the refrigerant liquid, which is supplied to the refrigerant supply path 124 from the refrigerant inlet 241a as illustrated in FIG. 13, is splashed in the outer diameter direction in the refrigerant splash path 14a of the housing space 14 from the first radial flow path 242a due to centrifugal force. Additionally, in parallel with the above, the refrigerant liquid that cools the rotor 12R via the radial flow path 242 and the rotor axial flow path 243 is splashed in the outer diameter direction in the refrigerant splash path 14a of the housing space 14 from the refrigerant outlet 243a at one end of the rotor 12R.

The action of the refrigerant liquid that splashes from the refrigerant outlet 243a is the same as in the first embodiment. That is, during low-speed rotation of the rotor 12R, the flow rate of the refrigerant liquid that splashes from the refrigerant outlets 243a is low, the proportion thereof that passes through the blocking wall member 5 toward the coil ends 32e is higher than during high-speed rotation, and the rate that is shielded by the blocking wall member 5 is lower than during high-speed rotation. Therefore, the coil ends 32e are cooled relatively more efficiently than the rotor core 22.

On the other hand, during high-speed rotation of the rotor 12R, the flow rate of the refrigerant liquid that splashes from the refrigerant outlets 243a is made to be high, the proportion that passes through the communication passage 51 decreases compared to during low-speed rotation, the supply rate to the coil ends 32e decreases, and the supply rate to the rotor core 22 and the permanent magnet 22a increases. The rotor core 22 and the permanent magnet 22a are thereby efficiently cooled.

The action of the refrigerant liquid that splashes from the first radial flow path 242a is the same as described above; during low-speed rotation of the rotor 12R, the flow rate of the refrigerant liquid that splashes from the refrigerant outlet 243a is low. Accordingly, the proportion of the refrigerant that passes through the blocking wall member 5 toward the coil ends 32e is higher than during high-speed rotation, and the coil ends 32e are cooled relatively more efficiently than the rotor core 22.

On the other hand, during high-speed rotation of the rotor 12R, the flow rate of the refrigerant liquid that splashes from the refrigerant outlets 243a is made to be high, the proportion that passes through the communication passage 51 decreases compared to during low-speed rotation, the supply rate to the coil ends 32e decreases, and the supply rate to the rotor core 22 and the permanent magnet 22a increases. The rotor core 22 and the permanent magnet 22a are thereby efficiently cooled.

In addition to exerting the effects of 1), 2), and 3) as described above in the first embodiment, the cooling structure for a dynamo-electric machine according to the twelfth embodiment described above exerts the following effects. Since supply of refrigerant liquid to the rotor axial flow path 243 is carried out from the second radial flow path 242b formed in the end plate 222e, the laminated steel plates that form the rotor core 22 may all have the same shape. Therefore, it is possible to reduce the number of parts of the rotor core 22, to reduce the trouble of layering steel plates having different shapes in predetermined positions during manufacture, and to thereby reduce cost.

Thirteenth Embodiment

Figure 14:
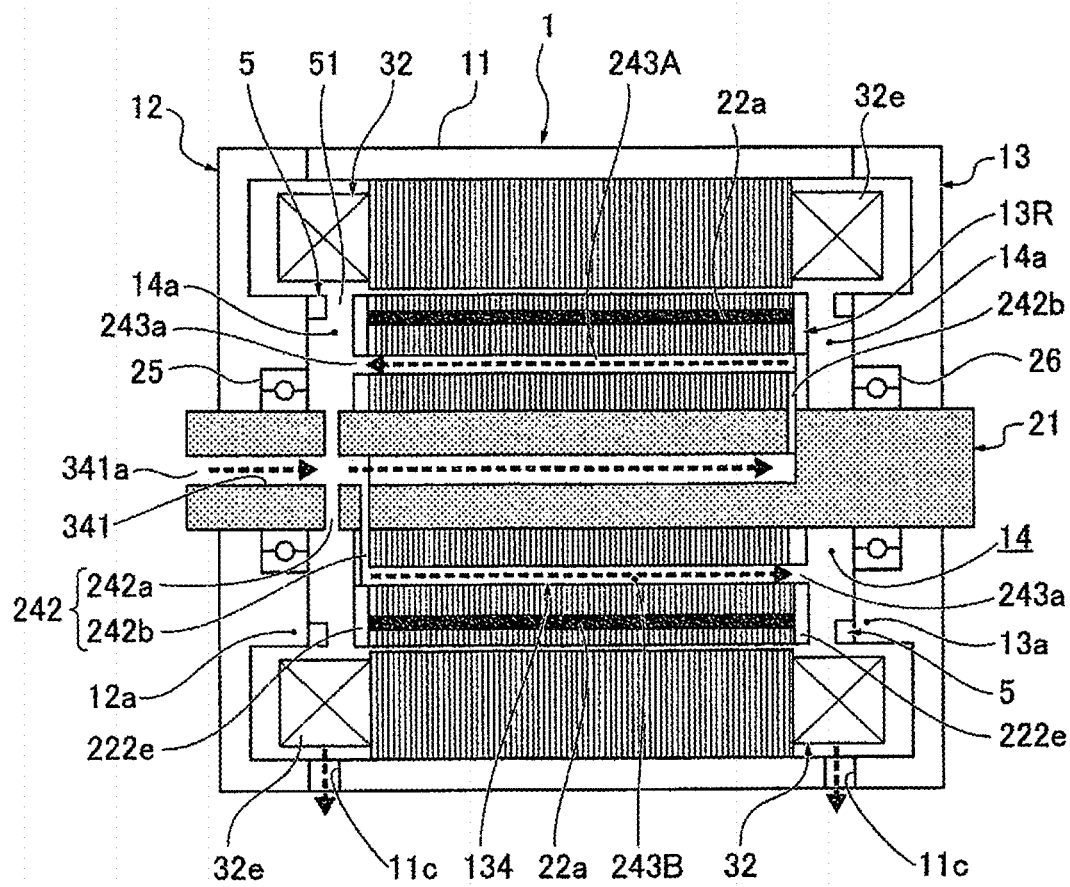
FIG. 14 is a cross-sectional view of a dynamo-electric machine provided with the cooling structure for a dynamo-electric machine according to the thirteenth embodiment.

The cooling structure for a dynamo-electric machine according to the thirteenth embodiment will be described. FIG. 14 is a cross-sectional view of a dynamo-electric machine to which is applied the cooling structure for a dynamo-electric machine according to the thirteenth embodiment. This thirteenth embodiment is a modified example of the twelfth embodiment, and the refrigerant supply path 134 comprises a first rotor axial flow path 243A and a second rotor axial flow path 243B. The two rotor axial flow paths 243A, 243B have exactly the same structures, but the mode of supplying the refrigerant liquid and the supply from the refrigerant outlets 243a to the housing space 14 are different.

That is, the rotor 13R comprises end plates 222e provided with the second radial flow path 242b as shown in the twelfth embodiment at both ends in the axial direction. Then, as shown, the first rotor axial flow path 243a is connected to the second radial flow path 242b as seen at the right side end portion in the drawing, and comprises a refrigerant outlet 243a as seen on the left side in the drawing. On the other hand, the second rotor axial flow path 243b is connected to the second radial flow path 242b at the left side end portion as seen in the drawing, and comprises a refrigerant outlet 243a as seen on the left side in the drawing.

Therefore, the rotational axis flow path 341 is formed from the refrigerant inlet 341a at one end of the rotor shaft 21 (left side end portion as seen in the drawing) to the position of the end plate 222e on the side far from the refrigerant inlet 341a in the axial direction, along the center axis of the rotor shaft 21.

In addition to comprising a first radial flow path 242a and a second radial flow path 242b in the same manner as the twelfth embodiment, the radial flow path 242 comprises a second radial flow path 242b formed in the end plate 222e as shown on the right side in the drawing.

As described above, since the first radial flow path 242a is opened to the refrigerant splash path 14a on the left side in the drawing, it is preferable that the number of first rotor axial flow paths 243A is greater than the number of second rotor axial flow paths 243B.

In the cooling structure for a dynamo-electric machine according to the thirteenth embodiment described above, in the same manner as in the twelfth embodiment, when the rotor 13R is rotated, the refrigerant liquid, which is supplied to the refrigerant supply path 134, is splashed in the outer diameter direction in the refrigerant splash path 14a of the housing space 14 from the first radial flow path 242a due to centrifugal force. Additionally, in parallel with the above, the refrigerant liquid that cools the rotor 13R via the radial flow path 242 and the two rotor axial flow paths 243A, 243B is splashed in the outer diameter direction in the refrigerant splash path 14a of the housing space 14 from the refrigerant outlets 243a.

Then, in the same manner as in the twelfth embodiment, during low-speed rotation of the rotor 13R, the proportion of the refrigerant that passes through the blocking wall member 5 from the first radial flow path 242a and the refrigerant outlets 243a toward the coil ends 32e is higher than during high-speed rotation, and the coil ends 32e are efficiently cooled.

On the other hand, during high-speed rotation of the rotor 13R, the flow rate of the refrigerant liquid that splashes from the first radial flow path 242a and the refrigerant outlets 243a is made to be high, the proportion that passes through the communication passage 51 decreases compared to during low-speed rotation, and the rotor core 22 and the permanent magnet 22a are efficiently cooled.

In addition to exerting the effects of 1), 2), and 3) as described above in the first embodiment, in the cooling structure for a dynamo-electric machine according to the thirteenth embodiment as described above, the laminated steel plates that form the rotor core 22 may all have the same shape, in the same manner as in the twelfth embodiment. Therefore, it is possible to reduce the number of parts of the rotor core 22, to reduce the trouble of layering steel plates having different shapes in predetermined positions during manufacture, and to thereby reduce cost.

The embodiments of the cooling structure for a dynamo-electric machine of the present invention are described above, but specific configurations thereof are not limited to these embodiments, and various modifications and additions to the design can be made without departing from the scope of the invention according to each claim in the Claims.

For example, in the embodiments, an example was given in which the blocking wall member is provided to one of the rotor core and the housing, but a blocking wall member may be provided to both the rotor core and the housing, and a communication passage may be formed between the two. In addition, the same shape as the blocking wall member may be integrally formed using one of the housing and the rotor core as the blocking wall. Additionally, when forming communication passages in the blocking wall, the cross-sectional shape thereof is not limited to the shapes shown in the embodiments.

The invention claimed is:

1. A dynamo-electric machine cooling structure for a dynamo-electric machine, comprising:
   a refrigerant supply path for introducing refrigerant into a rotor of a dynamo-electric machine;
   refrigerant outlets that are opened from the refrigerant supply path to a housing space outside the rotor such that the refrigerant splashes toward coil ends at opposite axial ends of a stator as the rotor is rotated; and
   blocking walls that are provided on the rotor and disposed in refrigerant splash paths between the refrigerant outlets and the coil ends to block a part of the refrigerant that splashes from the refrigerant outlets when the rotor is rotated,
   the blocking walls including communication passages passing through the blocking walls in a radial direction of the rotor,
   the blocking walls being arranged and configured to block the refrigerant from flowing from the refrigerant outlets toward the coil ends at positions farther from two axial end surfaces of the rotor and allow the passage of the refrigerant at positions closer to the axial end surfaces of the rotor so that a proportion of the refrigerant splashing from the refrigerant outlets which passes through the blocking walls and flows towards the coil ends is higher during low-speed rotation of the rotor than during high-speed rotation of the rotor
   the refrigerant outlets being provided in the two axial end surfaces, the rotor having a rotor core that includes the axial end surfaces, and
   the blocking walls being configured such that the communication passages are disposed radially outward from the refrigerant outlets, and such that a cross-sectional area of the communication passages is formed larger at portions of the blocking walls disposed axially closer to the axial end surfaces of the rotor core than at portions of the blocking walls disposed axially farther from the axial end surfaces of the rotor core in an axial direction of the rotor.

2. The dynamo-electric machine cooling structure according to claim 1, wherein
   each of the blocking walls is formed using a blocking wall member that is a separate body from both a rotor core of the rotor and a housing of the dynamo-electric machine forming a side surface of the refrigerant splash path.

3. The dynamo-electric machine cooling structure according to claim 2, wherein
   the blocking wall member has an annular shape in a portion farther from the axial end surface of the rotor.

4. The dynamo-electric machine cooling structure according to claim 1, wherein
   each of the blocking walls is integrally formed with the rotor core of the rotor.

5. The dynamo-electric machine cooling structure according to claim 1, wherein
   each of the blocking walls has an annular shape in a circumferential direction of the rotor at a portion of the blocking wall disposed farther from the axial end surface of the rotor.

6. A dynamo-electric machine cooling structure for a dynamo-electric machine, comprising:
   a refrigerant supply path for introducing refrigerant into a rotor of a dynamo-electric machine;
   refrigerant outlets that are opened from the refrigerant supply path to a housing space outside the rotor such that the refrigerant splashes toward coil ends at opposite axial ends of a stator as the rotor is rotated; and
   blocking walls are provided in refrigerant splash paths between the refrigerant outlets and the coil ends to block a part of the refrigerant that splashes from the refrigerant outlets when the rotor is rotated,
   each of the blocking walls including communication passages passing through the blocking wall in a radial direction of the rotor,
   each of the blocking walls having an annular shape around an entire circumference in a portion farther from the axial end surface of the rotor, and
   the blocking walls being arranged and configured to block the refrigerant from flowing from the refrigerant outlets toward the coil ends at positions farther from two axial end surfaces of the rotor and allow the passage of the refrigerant at positions closer to the axial end surfaces of the rotor so that a proportion of the refrigerant splashing from the refrigerant outlets which passes through the blocking walls and flows towards the coil ends is higher during low-speed rotation of the rotor than during high-speed rotation of the rotor,
   the refrigerant outlets being provided in the two axial end surfaces, the rotor having a rotor core that includes the axial end surfaces, and
   the blocking walls being configured such that the communication passages are disposed radially outward from the refrigerant outlets, and such that a cross-sectional area of the communication passages is formed larger at portions of the blocking walls disposed axially closer to the axial end surfaces of the rotor core than at portions of the blocking walls disposed axially farther from the axial end surfaces of the rotor core in an axial direction of the rotor.

7. The dynamo-electric machine cooling structure according to claim 6, wherein
the refrigerant outlets are provided on an outer perimeter surface of a rotor shaft that rotatably supports a rotor core, the refrigerant outlets being disposed axially outside the rotor, and
the blocking walls are configured such that the communication passages are disposed radially outward from the refrigerant outlets, and such that a cross-sectional area of the communication passages is formed larger at portions of the blocking walls disposed straight outward from the refrigerant outlets in the radial direction of the rotor than at portions of the blocking walls offset from the refrigerant outlets in an axial direction of the rotor.

8. The dynamo-electric machine cooling structure according to claim 6, wherein
each of the blocking walls is formed using a blocking wall member that is a separate body from both a rotor core of the rotor and a housing of the dynamo-electric machine forming a side surface of the refrigerant splash path.

9. The dynamo-electric machine cooling structure according to claim 6, wherein
each of the blocking walls is integrally formed with one of a rotor core of the rotor or a housing of the dynamo-electric machine forming a side surface of the refrigerant splash path.

* * * * *